United States Patent [19]

Brück et al.

[11] Patent Number: 5,370,943
[45] Date of Patent: Dec. 6, 1994

[54] HONEYCOMB BODY WITH NONHOMOGENEOUS ELECTRIC HEATING

[75] Inventors: Rolf Brück; Helmut Swars, both of Bergisch Gladbach, Germany

[73] Assignee: Emitec Gesellschaft fuer Emissionstechnologie mbH, Lohmar, Germany

[21] Appl. No.: 101,455

[22] Filed: Aug. 2, 1993

[30] Foreign Application Priority Data

Jan. 31, 1991 [DE] Germany ............................ 4102890

[51] Int. Cl.$^5$ .................... B01J 35/04; F01N 3/28; H05B 3/10; B01D 53/36
[52] U.S. Cl. ................... 428/593; 428/596; 502/527; 502/439; 422/174; 422/180
[58] Field of Search ............ 428/592, 593, 596, 931; 502/439, 527; 422/174, 180

[56] References Cited

U.S. PATENT DOCUMENTS

| | | | |
|---|---|---|---|
| 3,163,841 | 12/1964 | Willett | 338/292 |
| 4,152,302 | 5/1979 | Nonnenmann et al. | 428/593 |
| 4,487,034 | 1/1991 | Hitachi et al. | 422/180 |
| 4,576,800 | 3/1983 | Retallick | 422/180 |
| 4,647,435 | 3/1987 | Nonnenmann | 422/180 |
| 4,665,051 | 5/1987 | Nonnenmann | 502/439 |
| 4,753,918 | 6/1988 | Cyron | 502/439 |
| 4,822,766 | 4/1989 | Cyron | 502/439 |
| 4,958,428 | 9/1990 | Humpolik | 422/180 |
| 4,976,929 | 12/1990 | Cornelius et al. | 422/174 |
| 5,146,243 | 9/1992 | Maus | 422/174 |
| 5,215,722 | 6/1993 | Nishizama | 422/180 |
| 5,229,080 | 7/1993 | Moe et al. | 422/189 |

FOREIGN PATENT DOCUMENTS

| | | |
|---|---|---|
| 217593 | 10/1961 | Austria . |
| 0245736 | 8/1989 | European Pat. Off. . |
| 0245737 | 8/1989 | European Pat. Off. . |
| 0245738 | 8/1989 | European Pat. Off. . |
| 0223058 | 10/1989 | European Pat. Off. . |
| 0401646 | 12/1990 | European Pat. Off. . |
| 2138230 | 1/1973 | France . |
| 641679 | 1/1937 | Germany . |
| 3613744 | 10/1987 | Germany . |
| 8816514 | 12/1989 | Germany . |
| 3903879 | 8/1990 | Germany . |
| 8905073 | 10/1990 | Germany . |
| 732710 | 6/1955 | United Kingdom . |
| 8910470 | 11/1989 | WIPO . |
| 8910471 | 11/1989 | WIPO . |
| 9003220 | 4/1990 | WIPO . |

*Primary Examiner*—John Zimmerman
*Attorney, Agent, or Firm*—Herbert L. Lerner; Laurence A. Greenberg

[57] ABSTRACT

The invention pertains to a honeycomb body which can be electrically heated. Heating power is non-homogeneously distributed in the monolith. The honeycomb body is formed from at least one layered metal sheet which is wound or layered and intertwined. A multiplicity of flow channels for a fluid are provided. Each of the flow channels have openings at the two mutually opposite end faces of the honeycomb body. At least one current path is formed in the layers with an electrical resistance which is non-homogeneously distributed along the length of the path. The path can carry a current for heating the honeycomb body. According to the invention, the current path has an electrical resistance which is always adapted to the requirements of the voltage source to which the honeycomb is to be connected for the purpose of heating the same. Furthermore, the spatial distribution and the shape of the path in the honeycomb body may be adapted to specific requirements, for instance due to a certain geometry of the honeycomb or its intended use. Such honeycomb bodies are especially suited for heatable carriers for catalysts for converting noxious substances in exhaust gases of internal combustion engines, such as Otto engines. It is possible, with the catalyst carrier body to attain virtually instantaneous activation of the catalyst upon engine start-up.

20 Claims, 3 Drawing Sheets

HONEYCOMB BODY WITH NONHOMOGENEOUS ELECTRIC HEATING

CROSS-REFERENCE TO RELATED APPLICATION

This is a continuation of international application PCT/EP92/00190, filed Jan. 29, 1992, pending, and designating the United States.

BACKGROUND OF THE INVENTION

Field of the Invention

The invention relates to a honeycomb body of wound, stacked or otherwise stratified layers formed of at least one metal sheet, in which the layers form a plurality of channels which are substantially parallel to one another and through which a fluid can flow; the layers are electrically connected among one another in such a way that there is at least one path for carrying an electric current through the honeycomb body for the purpose of heating the same.

There are manifold uses for honeycomb bodies as carrier bodies for catalysts, intended for the catalytic conversion of reactable components of fluids. One particular field in which honeycomb bodies with catalysts are used is the catalytic cleaning of exhaust gases from internal combustion engines, particularly for motor vehicle engines. To that end, catalytically coated honeycomb bodies are installed in the engine exhaust systems, and the exhaust gases produced during engine operation flow through them.

The honeycomb bodies are manufactured from ceramic masses or from metal sheets. To form a metal honeycomb body, layers of metal sheets, some of which may be corrugated, folded or similarly structured, are stratified, stacked, spirally wound or otherwise intertwined. Possible ways of doing this are described in European Patents 0 223 058 B1 (corresp. to U.S. Pat. No. 4,824,011), 0 245 737 B1 (corresp. to U.S. Pat. Nos. 4,832,998 and 4,923,109), and 0 245 738 B1 (corresp. to U.S. Pat. Nos. 4,803,189 and 4,946,822); U.S. Pat. Nos. 4,753,918 and 4,822,766; Published International Applications WO 89/10470 A1, WO 89/10471 A1, and WO 90/03220 A1, and German Utility Model DE 89 08 738 U1.

Catalysts for converting reactable components of a fluid flowing around them are not catalytically effective until above certain threshold temperatures, the so-called critical temperatures. These are specific to the particular catalyst and to the reaction to be catalytically supported. In the case of catalysts for converting engine exhaust gas pollutants, the critical temperatures are typically several hundred degrees Celsius. For a catalyst to become active, it must accordingly be heated to a temperature above the critical temperature. In the exhaust system of a motor vehicle, this is effected as a rule by the exhaust gas flowing through catalyst-coated conduits, but then the catalytic action lags behind the starting of the engine.

To reduce this lag, electrical preheating of the catalyst, or of the honeycomb body carrying it, has been proposed heretofore. Instructions along these lines can be found in the above-noted WO 89/10470 A1, WO 89/10471 A1, and DE 89 08 738 U1. The layers of sheet metal that form the honeycomb body are electrically connected among one another in such a way that at least one path for carrying an electric current through the honeycomb body is available. The honeycomb body is also provided with power supply lines, to which a source of emf, an electric current source, such as a motor vehicle battery, is connected via suitable switching devices.

A honeycomb body of the usual size and structural type for use in the exhaust system of a motor vehicle requires a heating capacity of from several hundred watts to over 4 kW, in order to heat it up sufficiently quickly. Accordingly, an on-board electric system with a voltage of, say, 12 V, which is conventional in passenger cars, must furnish currents of up to more than 400 A for heating the honeycomb body. The problematic aspect here is the fact that a typical prior-art honeycomb body has an electrical resistance of at most several thousandths of an ohm. From a 12 V voltage source, such as a honeycomb body would draw currents of more than 1000 A. That, of course, would strain a typical on-board motor vehicle electrical system, in particular its battery, to a hardly allowable extent.

Provisions for increasing the electrical resistance of honeycomb bodies are already known as well. In the above-noted publications WO 89/10470 A1 and WO 89/10471 A1, electrically heatable honeycomb bodies are subdivided by gaps and/or electrically insulating partitions between the layers, in such a way as to produce at least one electric current path through the honeycomb body with an electrical resistance at a level that, with a voltage on the order of the usual voltage in an on-board motor vehicle electrical system, furnishes an allowable level of current through the honeycomb body and heat development of appropriate capacity in the honeycomb body.

In a further development, it has been proposed to provide two monoliths in series, i.e. instead of a single honeycomb body with a catalytic coating, two honeycomb bodies are used and the smaller, electrically heatable honeycomb body precedes the "main" catalyst carrier body. The larger honeycomb body need not be electrically heated. Both honeycomb bodies have essentially the same diameters, but the smaller honeycomb body is substantially shorter than the larger one. By reason of dimensions alone, a higher electrical resistance can be achieved with the smaller honeycomb body than with the larger one. Hence at a limited load on the voltage source, the smaller honeycomb body can be relatively quickly brought to a temperature above its critical temperature, whereupon the catalytically aided reaction ensues in the exhaust gas that flows first through the smaller honeycomb body and then through the larger honeycomb body. Due to the fact that the reaction is exothermic, this contributes to the further, accelerated heating of the larger honeycomb body, which finally takes on the majority of the task of catalytic conversion.

According to DE 89 08 738 U1, the sheet-metal layers that are provided for producing the honeycomb body may be provided with openings. By forming openings in the layers, a specific resistance of the sheet metal can be increased, making a honeycomb body with relatively high electrical resistance possible. However, this provision, like all other provisions aimed at reducing the thickness of the sheet metal used to make up a honeycomb body, becomes ineffective with increasing size of the honeycomb body. Enlarging a honeycomb body of a known type, while maintaining the ratios of the various dimensions to one another, always involves a reduction of its electrical resistance. In that, the teachings of the prior art must be combined with limitations in the dimensions of the honeycomb body. In turn, this means that in the prior art, in systems beyond certain dimensions, it is necessary to revert to two-piece honeycomb bodies, with all of the attendant problems.

SUMMARY OF THE INVENTION

It is accordingly an object of the invention to provide a honeycomb body with non-homogeneous electric heating, which overcomes the hereinafore-mentioned disadvantages of the heretofore-known devices of this general type, i.e. a honeycomb body in which the electrical resistance of a current path which carries the heating current through the honeycomb body is always set, regardless of the specific dimensions of the honeycomb body, to a value which permits heating with a predetermined electrical potential in an appropriate amount of time, and under only limited load on the electrical power source.

With the foregoing and other objects in view there is provided, in accordance with the invention, a honeycomb body, comprising: a jacket surface and mutually opposite end faces delimiting the honeycomb body and defining an interior space; sheet-metal layers disposed inside the jacket surface and between the end faces, the sheet-metal layers being formed with at least one metal sheet, the sheet-metal layers being wound, stacked or otherwise stratified; the sheet-metal layers defining a plurality of channels through which a fluid can flow between the end faces, the channels being open at the end faces; an electrically conductive path defined in the interior space and extending through the honeycomb body; and the electrically conductive path having an electrical resistance with a non-homogeneous resistance distribution along the path.

The honeycomb body according to the invention is particularly suitable as a carrier body for an exhaust gas catalytic converter. For the purpose of this application, the honeycomb body is defined as being delimited by two mutually opposite end faces and the at least one jacket surface is disposed between the end faces. The sheet-metal layers are layered from at least one metal sheet. The honeycomb body is wound, stacked or otherwise stratified. The layers form a multiplicity of channels between them through which a fluid can flow and each of which have openings in the end faces. One or more electrically conductive path is formed through the honeycomb body. A most important aspect of the invention is the fact that the path has an electrical resistance which is non-homogeneously, i.e. non-uniformly, distributed along the path.

The invention is based on the recognition that the spatial distribution of the heat production can be purposefully influenced by electrical heating in a honeycomb body. This is achieved by delimiting a plurality of regions in the honeycomb body that have electrical resistances differing from one another. The spatial distribution of these regions can determine the spatial distribution of the electric current passing through the honeycomb body. Accordingly, the distribution of heat production along the path of the electric current can be controlled by locally increasing the electrical resistance. Thus by purposefully increasing the electrical resistance of corresponding regions of the sheet-metal layers, zones can be formed that are heated to an increased extent by the electric current. In addition, the shape of the path in the honeycomb body can be purposefully varied and embodied, by suitable embodiment of the sheet-metal layers, such that non-homogeneous heating is achieved which is especially well adapted to the specific embodiment and the desired use.

In accordance with an added feature of the invention, the electrically conductive path is defined by at least one of the sheet-metal layers, the at least one sheet-metal layer having interruptions formed therein for increasing the electrical resistance along the electrically conductive path. The interruptions may be in the form of openings formed in the at least one sheet-metal layer. In accordance with another feature of the invention, the sheets include a barrier zone in the at least one sheet-metal layer adjacent the electrically conductive path, the barrier zone defining a region which is substantially impenetrable by an electric current.

A non-homogeneous distribution of the electrical resistance along the current-carrying path through the honeycomb body according to the invention is especially easily achieved by delimiting the path in the layers by means of interruptions. Specifically, these interruptions in the layers are interruptions in the planar field of the sheet metal. For example openings, voids, slits or indentations are provided. Advantageously, at least one barrier zone is provided from which the electric current is kept away to the maximum possible extent. The interruptions may for instance be long slots or slits that define the path. The path is accordingly a structure comprising at least one striplike sheet metal part. The striplike part may vary in width, so as to provide the non-homogeneous distribution of the resistance over its length. Instead of long slots which are aligned substantially parallel to the path, an adequate number of interruptions may also be provided, each of which is disposed substantially transversely to the direction of the current path. A configuration with such interruptions likewise presents a high, although finite resistance to an electric current and it is capable of contributing substantially to concentrating the electric current in a given region.

The invention makes it possible to define the location of the path in the honeycomb body freely. Accordingly, in accordance with another feature of the invention, the heating zone is disposed in the interior space in the vicinity of one of the two end faces. It is very advantageous when the current path, i.e. the heating path, is located in the vicinity of one of the two end faces. A honeycomb body coated with a catalyst is typically operated by directing a flow of fluid, e.g. exhaust gas, through its channels. The fluid includes reactable components which, upon contact with the catalyst material coated on the channel walls, reacts in chemically defined mechanisms. The flow inherently takes place from one end face of the catalyst carrier body to the other. The resistance path is preferably disposed in the vicinity of the end face at which the fluid to be cleaned enters the channels. As in many applications the catalytic reaction is exothermic, it can be utilized to furnish heat for heating the honeycomb body. The catalytically aided reaction is thus best initiated at the forward (upstream) end face of the honeycomb body. The exothermic heat production in the reaction heats the other parts of the catalyst carrier body, and thus the remaining catalyst material, very quickly. In other words, the reaction which is first tripped by the electric heating, supplies heat to the fluid, with which the regions of the honeycomb body through which the fluid subsequently flows can be heated. Moreover, the increased heating of the forward end face has the advantage that cooling of the honeycomb body by an incoming fluid, the temperature of which is substantially below the critical temperature of the catalytic converter, can be lessened and possibly even suppressed.

In accordance with yet a further advantageous feature of the invention (applicable to any of the several embodiments), the layers are provided with at least one heating zone and at least one conducting zone, the conducting zone and the heating zone are electrically connected in series and the conducting zone has a markedly lower electrical resistance than the heating zone. The heat development in the conducting zone is substantially less than the heat development in the heating zone. Within the path, therefore, regions for distributing the electrical current (conducting zones) are partitioned off from regions for heating (heating zones) the honeycomb body at defined locations. The heating of the honeycomb body can thus be made more intensively non-homogeneous and may be embodied so as to obtain optimized heating.

In accordance with yet a further feature of the invention, the layers have at least one heating zone disposed in the interior space and radially spaced apart from said jacket surface. This feature is provided with a view to avoiding heat losses from conduction and/or radiation. The heating zone, i.e. the high-resistance region on the layer, is disposed a certain distance away from the jacket. Although, in this case, adequate heating of the peripheral regions of the honeycomb body is still assured by thermal conduction and/or thermal radiation, heat losses to the outside of the honeycomb body are limited to an adequately slight amount.

As already mentioned, the disposition of the heating zone in the vicinity of a one of the two end faces is quite advantageous, because in this way the heat produced in the catalytically aided reaction can be utilized for further heating of the honeycomb body.

The heating zone is preferably formed by providing the layers with interruptions, i.e. interruptions which restrict current flow on the metal sheet. These interruptions are provided at those locations on the metal sheet which are to be disposed in the heating zone. The preferred interruptions are openings, slits, voids, slots or indentations. The voids are favorably formed by stamping. In forming the indentations, embossing and etching methods may be used. It is also conceivable to build up the layers in multiple strata from at least one perforated and one unperforated metal sheet.

In a favorable further feature of the invention which is again applicable to any of the embodiments, the form of the interruptions that affect the electrical resistance of the various zones of the honeycomb body is adapted to the distribution of the electric current in the honeycomb body. Each interruption is assigned a particular current flow direction, specifically the direction in which the electric current flows around the interruption, i.e. it "bathes" the interruption. It is favorable if the interruption is an oblong hole extended at substantially right angles to the respective flow direction. The course that the electric current must take becomes especially long in this way. This results in an especially high mean specific electrical resistance of the applicable zone of the honeycomb body, which is especially desirable for a honeycomb body for use in a motor vehicle.

In any embodiment of the invention, the interruptions may comprise either holes or indentations (regions of reduced sheet-metal thickness). Depending on the application, it is possible in particular to provide some openings and some indentations, or just openings alone.

In contrast with insulating layers of ceramic or the like (the use of which, incidentally, is in no way precluded by the present invention), metal sheets with the interruptions do not present any problems in terms of mechanical strength, at least as long as the number and distribution of the interruptions is limited to an appropriate number. The zones in the honeycomb body in which the metal sheets are provided with interruptions can in principle be stabilized equally well, by means of form-locking connections of the sheet-metal layers among one another, at the zones in which the sheet-metal layers are free of interruptions. No "foreign bodies" need to be provided which could pose a problem with respect to proper joining to the metal sheets and which might impair the strength of the honeycomb body.

In accordance with again a further feature of the invention, the layers of the honeycomb body are formed by alternating layers of a substantially smooth first sheet and a roundly corrugated or zig-zagged second sheet. Only the first, smooth sheet is then provided with interruptions. The courses available for the electric current through a corrugated or similarly structured metal sheet are always substantially longer than the courses through a smooth sheet; therefore the advantages of the invention are already attained even if only the smooth sheet is provided with interruptions. This is especially valuable in terms of rational manufacture, because multiple machining operations on the sheets forming the honeycomb body are not required. It should be noted that in the honeycomb body, in addition to the structuring of the metal sheets according to the invention, insulating layers may be provided. Such insulating layers may for instance serve to insulate smooth sheets (structured with the interruptions) from corrugated sheets (not structured with interruptions). By way of example, insulating layers or films may be ceramic layers applied by flame spraying or similar processes.

The embodiment of the invention described in the foregoing may be advantageously improved by selecting the material and/or the thickness of the first and second sheets such that the specific electrical resistance of the second, corrugated or similarly structured sheet is substantially greater than that of the first, smooth sheet. In this way, the displacement of the electric current from the second sheet is further reinforced, and the capability of providing barrier zones (see explanation above) is assured as extensively as possible.

Other features which are considered as characteristic for the invention are set forth in the appended claims.

Although the invention is illustrated and described herein as embodied in a honeycomb body with non-homogeneous electric heating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
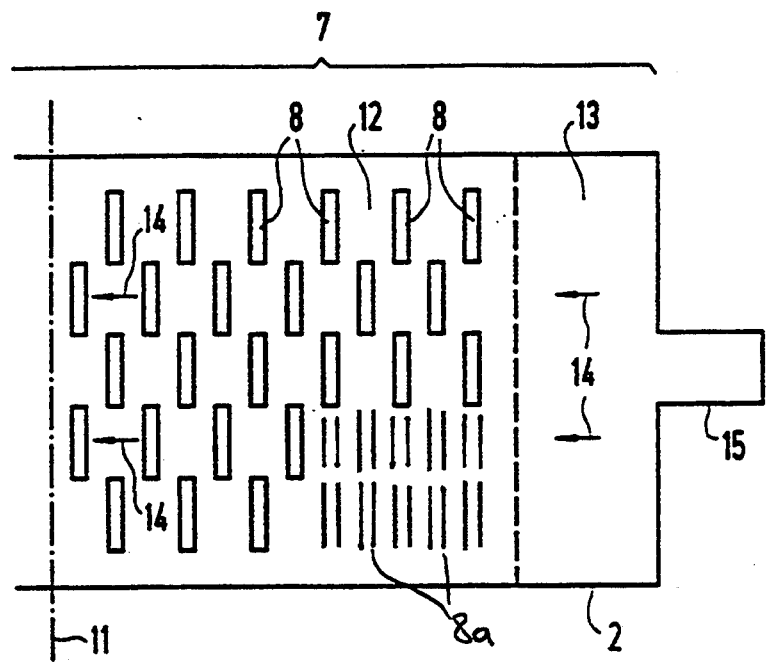
FIG. 1 is a top-plan view of a smooth metal sheet provided with voids and slits for use in a honeycomb body according to the invention, in a simple embodiment.

Referring now to the figures of the drawing in detail, and first, particularly, to FIG. 1 thereof, a smooth metal sheet 2 may be used with further smooth and optionally corrugated or similarly structured sheets of the same type to build up a honeycomb body according to the invention. Only one half of the smooth sheet 2 is shown; the sheet 2 should be considered to be symmetrical with respect to a center line 11. When the sheet 2 is installed in a honeycomb body, it is heated by conducting an electric current therethrough. A flow direction of the current is indicated with arrows 14. The electric current is supplied to the sheet 2 at a first current terminal 15 and drawn from the sheet 2 at a second, non-illustrated terminal.

The sheet 2 is basically divided into a heating zone 12 and a conducting zone 13. The heating zone 12 has a markedly higher electrical resistance than the conducting zone 13. The conducting zone 13 serves primarily to distribute the electric current that is supplied to or drawn from the current terminal 15. Heat production, therefore, takes place primarily in the heating zone 12. The electrical resistance of the sheet 2 in the heating zone 12 is increased by means of interruptions in the plane of the sheet. The interruptions 8 force the electric current to take a meandering path along the uninterrupted metal structure. The path 7 in the example of FIG. 1 corresponds to the entire metal sheet 2, because there is a homogeneous flow through the overall sheet, except for locally limited effects at the interruptions 8 and the terminal 15.

The form of the recesses 8 is selected such that the resistance of the heating zone 12 is very high, and often as high as structurally possible. In particular, the recesses 8 are embodied as voids or openings 8 with a given area of sheet stamped out of the sheet. In other words, a part of the material is removed. The voids 8 are elongated at right angles to the flow direction 14. Alternatively, the interruptions may be very narrow slits 8a, without any material removed. The slits may have a width in the order of 1/1000 mm and it is seen that no arcing across the slits will occur due to the very low voltage. The voids 8 and the slits 8a are defined herein as openings. The electrical resistance of the heating zone 12 can also be increased if the interruptions 8 were not holes but were recesses or indentations 8 instead. Then the effects described above would arise to only a reduced extent, but depending on the application that may be sufficient.

Figure 2:
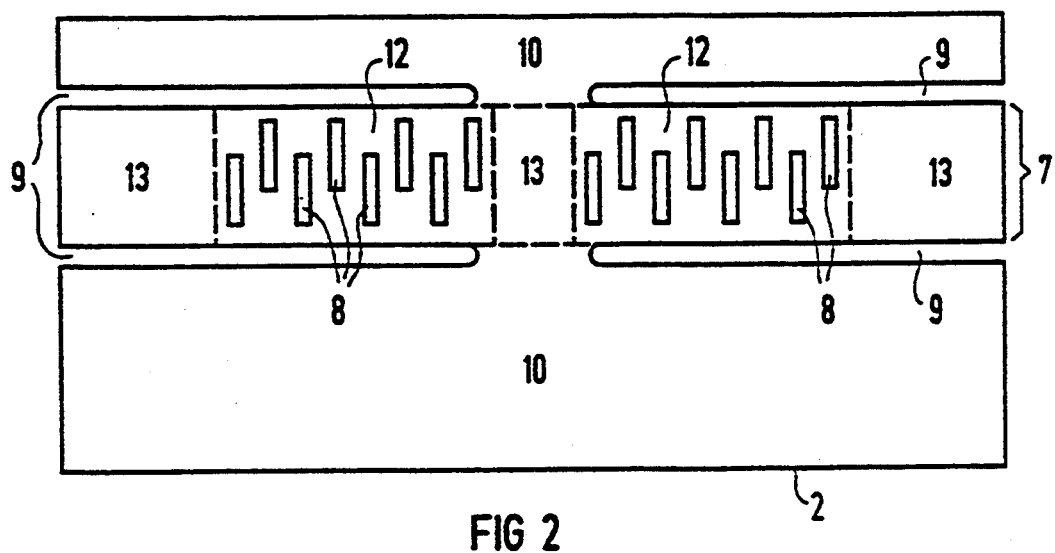
FIG. 2 is a similar view of another embodiment of a metal sheets for honeycomb bodies according to the invention.

FIG. 2 shows another exemplary embodiment of a smooth sheet 2 for building up a honeycomb body according to the invention. In this sheet 2, the width of the overall current path 7 is not equivalent to the entire width of the sheet 2. Instead, a striplike portion of the sheet 2 is partitioned off as a path 7 by four long slots 9. On the short sides of the sheet 2, the path 7 initially has one conducting zone 13 each, into which the electric current is fed or from which the current is returned, for example. Another conducting zone 13 is located in the middle of the sheet 2. The path 7 also has one heating zone 12 between each two conducting zones 13. The electrical resistance of each heating zone 12 is increased by means of openings or cutouts 8, as in the preceding example.

As in the embodiment of FIG. 1, elongated voids 8 are shown. It is understood that interruptions of a different shape may also be appropriate, depending on the specific requirements. The electric current flowing through the path 7 virtually does not penetrate barrier zones or depletion zones 10 adjoining the long sides of the sheet 2. The barrier zones 10 are substantially impenetrable to the heating current.

An alternative way in which the sheet 2 of FIG. 2 may be used should be noted: It may be appropriate to have a first connecting terminal for the electric current in each of the two conducting zones 13 on the short sides of the sheet 2, and a second connecting terminal on one of the long sides of the sheet 2. In this way, a Y-shaped path 7 is provided for the current. The current through the regions provided as barrier zones 10 in accordance with FIG. 2 in the context of the first-described use of the sheet 2 may also be returned to the short sides and drained from there.

Figure 3:
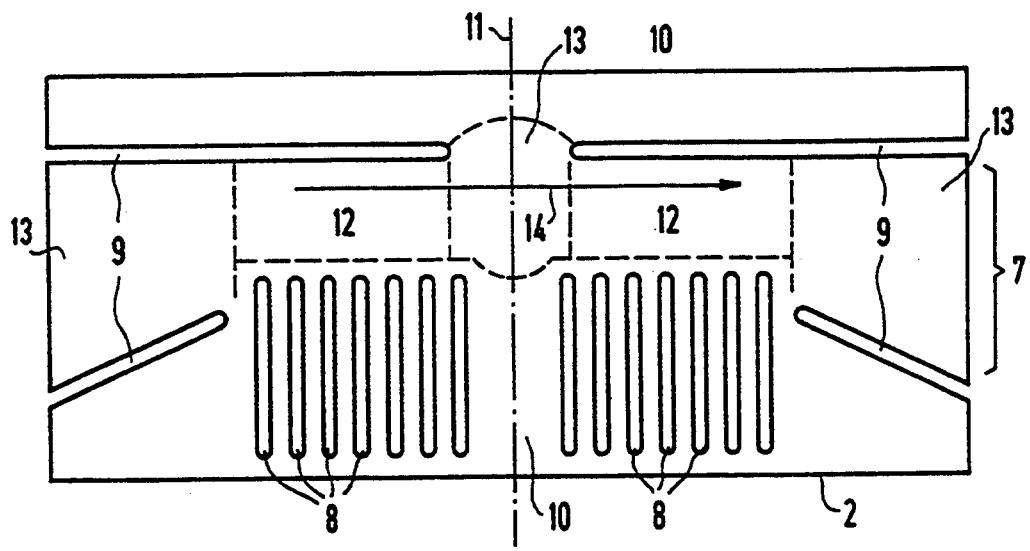
FIG. 3 is a similar view of yet another embodiment.

Referring now to FIG. 3, which illustrates a variant of the smooth sheet of FIG. 2, the slots 9 shown in the lower region of the sheet 2 are shortened. Again, the slots 9 delimit the path 7 but in that one region they are replaced with elongated interruptions 8. The interruptions 8 define a barrier zone 10 having an electrical resistance whose magnitude precludes a significant flow of electric current. The heating zones 12 are defined by constrictions of the path 7. The relatively high electrical resistance of each heating zone 12 is attained solely by constricting the cross section of the path 7. There are no interruptions in the region of the center line 11, and the slots 9 also assure a certain spacing from the center line 11. Thus the current flowing through the path 7 has an enlarged cross section available, thereby furnishing a central conducting zone 13.

Figure 4:
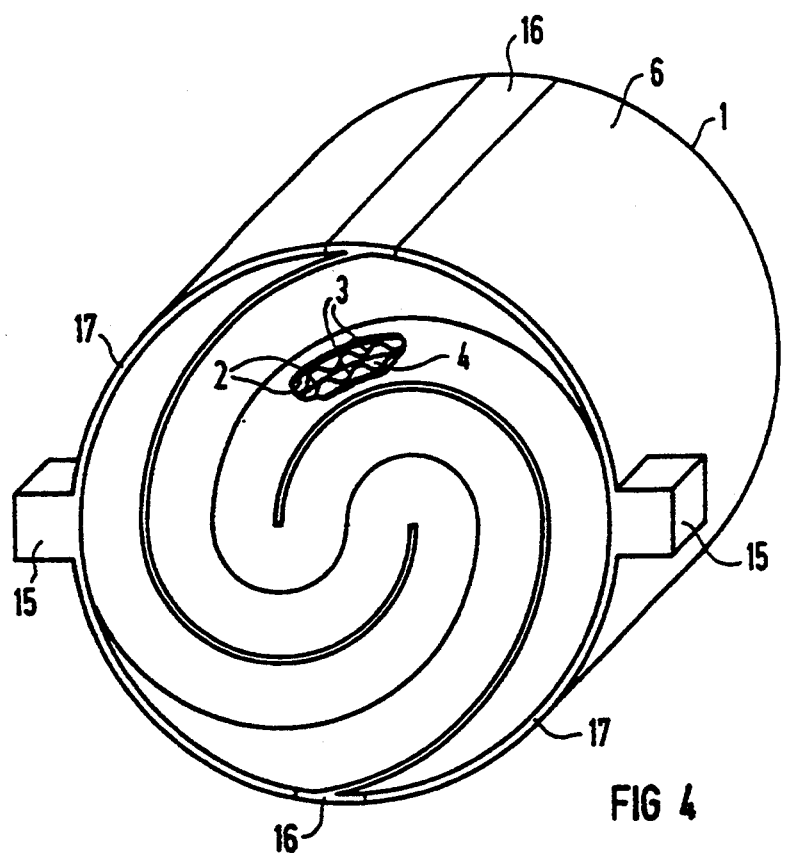
FIG. 4 is a perspective view of a honeycomb body according to the invention.

FIG. 4 illustrates how a honeycomb body 1 according to the invention can be assembled. A stack of smooth sheets 2 and structured sheets 3 is intertwined in an S and placed in a jacket 6. The structured sheet 3 may be corrugated, i.e. round-corrugated (sine-form) or zig-zag-bent (accordion). Individual windings of the stack are separated from one another by ceramic insulating elements 16, which protrude all the way into the jacket 6 of the honeycomb body 1. The jacket 6 is formed by two jacket sheets 17, which are separated from one another by the insulating elements 16. The jacket sheets 17 may be described as being approximately semicircular in cross-section or as being semi-cylinders. They are formed of metal. Each jacket sheet 17 has one current terminal 15. The path for the heating current in the honeycomb body 1 is wound in just the same way as the stack. An electric current flowing through the honeycomb body 1 primarily takes the course of the layers formed by the sheets 2 and 3. Although conduction from one layer to another is possible, such usually entails detours. Preferably, the electric current stays within the layers defined by the smooth sheets 2, because the paths through these layers are shortest. The concentration or limitation of the electric current to the smooth sheets 2 is increased further under some circumstances if the corrugated sheets 3 have an increased specific electrical resistance compared with the smooth sheets 2 by reason of a suitably reduced thickness and/or the use of a different material. As a rule, the advantages attainable with the present invention are already attained even if only the smooth sheets 2 are provided with interruptions, such as openings, slits or recesses and the like.

Figure 5:
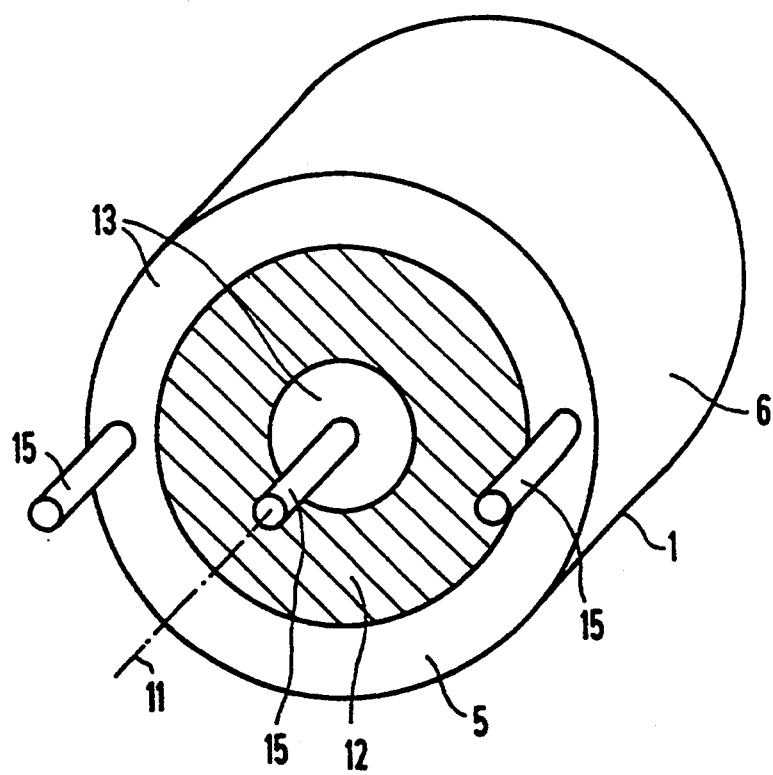
FIG. 5 is a perspective view of another embodiment of a honeycomb body.

FIG. 5 shows a further embodiment of the honeycomb body 1 according to the invention. The honeycomb body 1 has current terminals 15 on one end face 5 thereof. Two of these current terminals 15 are located in the vicinity of the outer jacket 6, and one current terminal 15 is disposed on the center of the body. The center corresponds to the center line 11. For the purpose of conducting electric current through the honeycomb body, the current terminals 15 in the vicinity of the jacket face 6 are connected in parallel. The electric current flows radially between the terminals 15 in the vicinity of the jacket 6 and the current terminal 15 in the vicinity of the center line 11. The region of the honeycomb body immediately adjoining the jacket 6 is embodied as a conducting zone 13 with a very small electrical resistance. In this way, the electric current can advance, distributed substantially uniformly, from the outer regions of the honeycomb body 1 to the center line 11. Between the two conducting zones 13, a hollow-cylindrical heating zone 12 is defined. Heat production due to the current between the terminals 15 takes place primarily in the heating zone 12. The heating zone 12 may be optimized in form with a view to uniform heating of the honeycomb body 1 while simultaneously avoiding heat losses through the jacket 6.

With the present invention, an electrically heatable honeycomb body is disclosed, the electrical parameters of which are adapted, regardless of the specific mechanical dimensions, to the voltage source available for furnishing the electric current. The spatial distribution of the heating in the honeycomb body can be adapted to the specific mechanical and operating requirements. The honeycomb bodies according to the invention are especially suitable for use as heatable carriers for catalysts for converting pollutants in the exhaust gases of internal combustion engines, such as Otto engines, i.e. gasoline engines. The honeycomb bodies according to the invention allow virtually immediate activation of the catalytic converters each time the engine is turned on.

We claim:

1. A honeycomb body, comprising:
   a jacket surface and mutually opposite end faces delimiting the honeycomb body and defining an interior space;
   sheet-metal layers disposed inside said jacket surface and between said end faces, said sheet-metal layers being formed with at least one metal sheet;
   said sheet-metal layers defining a plurality of channels through which a fluid can flow between said end faces, said channels being open at said end faces;
   an electrically conductive path defined in said interior space and extending through the honeycomb body;
   said electrically conductive path having an electrical resistance with a non-homogeneous resistance distribution along said path; and
   a current terminal connected to at least one of said sheet-metal layers for electrically connecting the honeycomb body.

2. The honeycomb body according to claim 1, wherein said electrically conductive path is defined by at least one of said sheet-metal layers, said at least one sheet-metal layer having interruptions formed therein for increasing the electrical resistance along said electrically conductive path.

3. The honeycomb body according to claim 2, wherein said interruptions are in the form of openings formed in said at least one sheet-metal layer, and including a barrier zone in said at least one sheet-metal layer adjacent said electrically conductive path, said barrier zone defining a region being substantially impenetrable by an electric current.

4. The honeycomb body according to claim 2, wherein said interruptions are in the form of slits formed in said at least one sheet-metal layer, and including a barrier zone in said at least one sheet-metal layer adjacent said electrically conductive path, said barrier zone defining a region being substantially impenetrable by an electric current.

5. The honeycomb body according to claim 2, wherein said interruptions are in the form of indentations formed in said at least one sheet-metal layer, and including a barrier zone in said at least one sheet-metal layer adjacent said electrically conductive path, said barrier zone defining a region being substantially impenetrable by an electric current.

6. The honeycomb body according to claim 1, wherein said mutually opposite end faces are a first end face and a second end face, said electrically conductive path extending primarily in the vicinity of said first end face.

7. The honeycomb body according to claim 1, wherein
   a) said path includes at least one heating zone and at least one conducting zone;
   b) said conducting zone and said heating zone being electrically connected in series; and
   c) said conducting zone having an electrical conduction resistance and said heating zone having an electrical heating resistance, said heating resistance being greater than said conduction resistance, said heating and conduction resistance together defining said non-homogeneous resistance distribution.

8. The honeycomb body according to claim 7, wherein said at least one heating zone is disposed in said interior space and radially spaced apart from said jacket surface.

9. The honeycomb body according to claim 7, wherein said at least one heating zone is disposed in said interior space in the vicinity of one of said two end faces.

10. The honeycomb body according to claim 7, wherein said layers, in said at least one heating zone, have interruptions formed therein.

11. The honeycomb body according to claim 10, wherein said interruptions are one of slits, slots and indentations formed in said layers.

12. The honeycomb body according to claim 10, wherein current flow directions are defined in said heating zone, each of said interruptions extending substantially tranversely to a respective one of said current flow directions.

13. The honeycomb body according to claim 2, wherein some of said interruptions are openings formed in said at least one layer, all other interruptions being indentations.

14. The honeycomb body according to claim 2, wherein said interruptions are openings in the form of voids.

15. The honeycomb body according to claim 2, wherein said sheet-metal layers are formed of alternating layers of a substantially smooth first sheet and a structured second sheet; only said first sheet having said interruptions formed therein.

16. The honeycomb body according to claim 15, wherein said structured second sheet is one of round-corrugated and zig-zag bent.

17. The honeycomb body according to claim 16, wherein said first and second sheets each have a specific electrical resistance, the specific electrical resistance of said second sheet being substantially greater than the specific electrical resistance of said first sheet.

18. The honeycomb body according to claim 10, wherein said interruptions are voids formed in said layers.

19. The honeycomb body according to claim 2, wherein said interruptions are openings in the form of slots.

20. A metallic honeycomb catalyst carrier body for exhaust systems of motor vehicles, comprising:
a jacket member and mutually opposite end faces delimiting the metallic honeycomb catalyst carrier body and defining an interior space;
stratified sheet-metal layers disposed inside said jacket member and extending between said end faces, said sheet-metal layers being formed from at least one metal sheet;
said sheet-metal layers defining a multiplicity of channels through which an exhaust gas can flow between said end faces, said channels being open at said end faces;
an electrically conductive path defined in said interior space and extending through the metallic honeycomb catalyst carrier body;
said electrically conductive path having an electrical resistance with a non-homogeneous resistance distribution along said electrically conductive path; and
a current terminal connected to at least one of said sheet-metal layers for electrically connecting the metallic honeycomb catalyst carrier body.

* * * * *